United States Patent [19]
Nakajima

[11] Patent Number: 5,238,039
[45] Date of Patent: Aug. 24, 1993

[54] PNEUMATIC RADIAL TIRES HAVING CARCASS LINE WITH PLURAL INFLECTION POINTS

[75] Inventor: Yukio Nakajima, Tokyo, Japan

[73] Assignee: Bridgestone Corporation, Tokyo, Japan

[21] Appl. No.: 508,452

[22] Filed: Apr. 13, 1990

[30] Foreign Application Priority Data

Apr. 17, 1989 [JP] Japan .................................. 1-95327

[51] Int. Cl.$^5$ .............................................. B60C 3/00
[52] U.S. Cl. .................................... 152/454; 152/510; 152/548
[58] Field of Search .............. 152/454, 456, 457, 517, 152/522, 510, 548

[56] References Cited

U.S. PATENT DOCUMENTS

| | | | |
|---|---|---|---|
| 3,631,913 | 1/1972 | Boileau | 152/454 |
| 4,061,171 | 12/1977 | Boileau et al. | 152/454 |
| 4,867,218 | 9/1989 | Asano et al. | |

FOREIGN PATENT DOCUMENTS

| | | |
|---|---|---|
| 0273558 | 6/1988 | European Pat. Off. . |
| 0314445 | 3/1989 | European Pat. Off. . |
| 352140 | 1/1990 | European Pat. Off. ............ 152/454 |
| 63-154402 | 6/1988 | Japan . |
| 2070526 | 9/1981 | United Kingdom . |

Primary Examiner—Geoffrey L. Knable
Attorney, Agent, or Firm—Sughrue, Mion, Zinn, Macpeak & Seas

[57] ABSTRACT

In a pneumatic radial tire comprising a radial carcass and a belt, when the tire is mounted onto a normal rim and inflated under an internal pressure corresponding to 5% of a normal internal pressure, a carcass line of the carcass in radial section of the tire at a self-posture under no load has at least two inflection points between positions A and C and/or between positions C and B in which A is a position corresponding to each end of the belt at its maximum width, B is a position corresponding to a width of the normal rim and C is a position corresponding to a maximum width of the carcass.

4 Claims, 5 Drawing Sheets

FIG_3 ial tire according to the invention;

PNEUMATIC RADIAL TIRES HAVING CARCASS LINE WITH PLURAL INFLECTION POINTS

BACKGROUND OF THE INVENTION

1. Field of the Invention

This invention relates to pneumatic radial tires having improved running performances.

2. Related Art Statement

Particularly, the improvement of the running performance in this type of the tire is strongly demanded in pneumatic radial tires for passenger cars because it is required to always ensure a stable steering property in the passenger car in accordance with remarkable fullness of the equipment and performance in the passenger car as well as the enlargement and development of road networks In order to improve the running performance of the pneumatic tire, it is necessary to have sufficient rigidity in the tread portion and bead portion of the tire. For this purpose, there is considered a countermeasure of strengthening the reinforcement at the tread and bead portions, a countermeasure of raising an air pressure filled in the inside of the tire, and the like.

However, the quantity of reinforcing member required and used for strengthening of the reinforcement is generally increased to undesirably raise the cost. On the other hand, as the internal pressure becomes higher, the ground contact area of the tread portion reduces to obstruct the transmission of necessary force, and consequently the steering performance, and traction and braking performances are degraded.

That is, the tire should be used under such an internal pressure as to hold a balance capable of accepting merits through the strengthening of the rigidity and demerits due to the degradation of the performances. However, the strengthening of the rigidity without causing the increase of the cost can not be achieved by the above conventional technique.

SUMMARY OF THE INVENTION

It is, therefore, an object of the invention to provide a novel pneumatic radial tire for automobiles, particularly a passenger car which can advantageously realize the reinforcement of tread and bead portions in the tire without excessively using the reinforcing member over the conventionally adopted limit and increasing the internal pressure.

According to the invention, there is the provision of a pneumatic radial tire having improved running performance comprising a carcass composed of at least one radial cord ply toroidally extending between a pair of bead portions as a casing reinforcement for sidewall portions and tread portion connecting to the bead portions, at least one cord ply of which carcass being wound around a bead core of the bead portion from inside of the tire toward outside thereof to form a turnup structure, and a belt composed of plural cord layers arranged along a crown portion of the carcass as a tread reinforcement, characterized in that when the tire is mounted onto a normal rim and inflated under an internal pressure corresponding to 5% of a normal internal pressure, a carcass line of the carcass in radial section of the tire at a self-posture under no load has at least two inflection points between positions A and C and/or between positions C and B in which A is a position corresponding to each end of the belt at its maximum width, B is a position corresponding to a width of the normal rim and C is a position corresponding to a maximum width of the carcass.

In a preferred embodiment of the invention, heights $H_1$, $H_2$ and M of the positions A, B and C measured from a rim base line of the normal rim are within ranges of 0.80–1.0, 0.10–0.25 and 0.35–0.70 per a carcass maximum height H measured from the same rim base line, respectively.

BRIEF DESCRIPTION OF THE DRAWINGS

The invention will be described with reference to the accompanying drawings, wherein.

DESCRIPTION OF THE PREFERRED EMBODIMENTS

Figure 1:
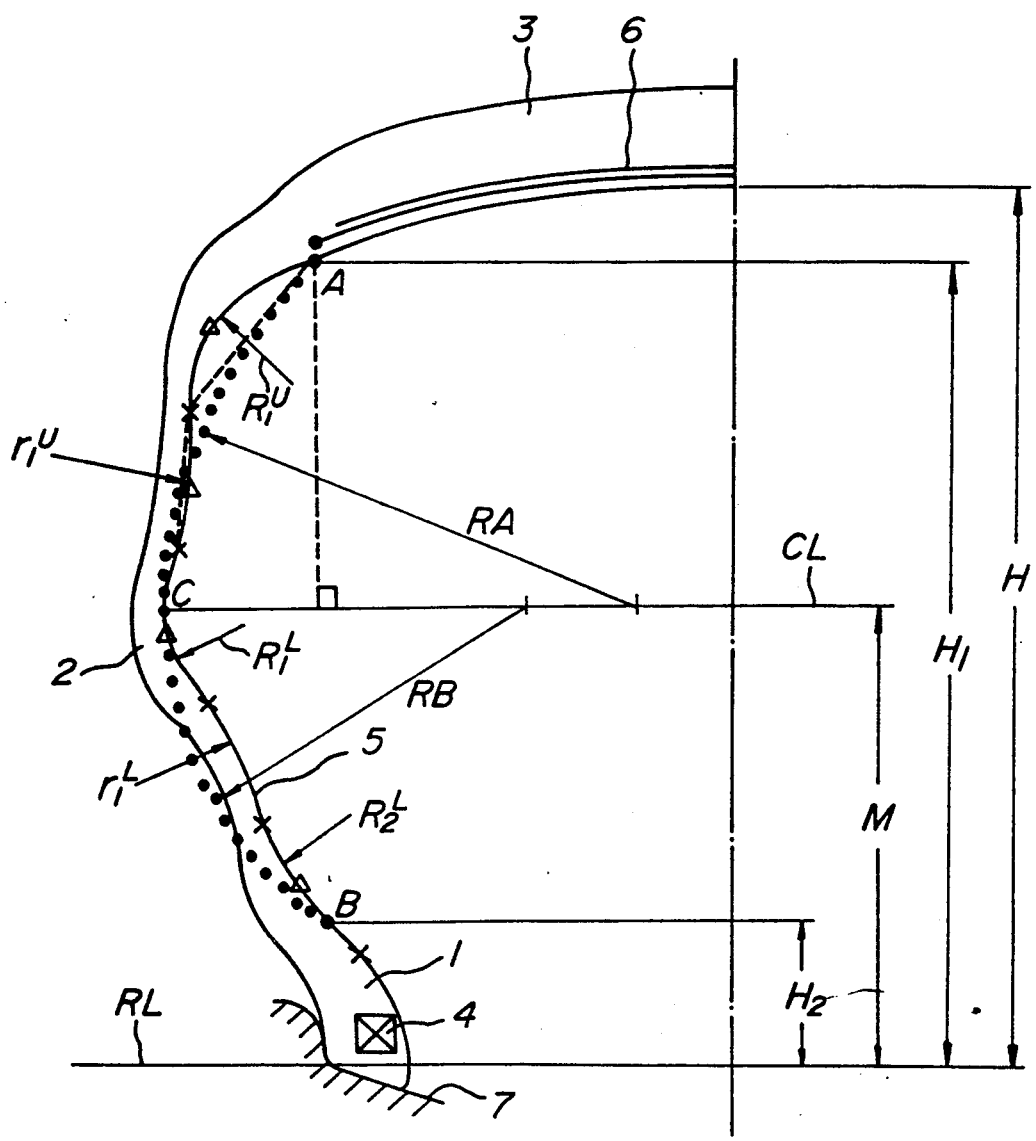
FIG. 1 is a schematic view illustrating the carcass line according to the invention.

In FIG. 1 is shown a left-half section of the pneumatic radial tire for passenger car according to the invention in the radial direction thereof at a self-posture under no load when the tire is mounted onto a rim and inflated under an internal pressure corresponding to 5% of a normal internal pressure. This tire is symmetry with respect to the equator of the tire.

In FIG. 1, numeral 1 is a bead portion, numeral a sidewall portion, numeral 3 a tread portion, numeral 4 a bead core, numeral 5 a carcass, numeral 6 a belt and numeral 7 a normal rim closely fitted into the bead portion 1.

The carcass 5 is comprised of at least one radial cord ply toroidally extending between the bead portions 1. In the illustrated embodiment, the carcass is comprised of a single cord ply, but two or three plies may be used. In any case, at least one cord ply is wound around the bead core 4 from inside of the tire toward outside thereof to form a turnup structure according to the usual manner.

In the above tire section at the self-posture under no load, an intersect point of a perpendicular line drawn from a widthwise end of a belt cord layer having a maximum width in the belt 6 toward a rim base line RL of the normal rim 7 with the carcass 5 is defined as a position A, and an intersect point of a perpendicular line drawn from the rim base line RL with the carcass 5 at a position corresponding to an end of the rim width of the normal rim 7 is defined as a position B, and a point corresponding to the maximum width of the carcass 5 is defined as a position C. Further, a straight line passing through the position C and in parallel to the rim base line RL is CL, and a radius of an arc having a center on the straight line CL and passing through the positions A and C is RA, and a radius of an arc having a center on the straight line CL and passing through the positions B and C is RB. Moreover, in the carcass 5 shown by a meandering curve, a mark X is an inflection point of the carcass line and a mark Δ is a point most separated from a line segment connecting the position A or B to the inflection point X or a line segment connecting the adjoining inflection points X to each other. Among arcs passing through the position A or B, the inflection point or adjoining inflection points and the point Δ, a radius of an arc having a center in the inner direction of the tire and locating the point Δ toward the belt 6 with respect to the straight line CL as a standard is represented by $R_i^U$ (i=1, ... $n^U$), and a radius of an arc having a center in the inner direction of the tire and locating the point Δ toward the normal rim 7 with respect to the straight line CL as a standard is represented by $R_i^L$ (i=1, ... $N^L$), and a radius of an arc having a center in the outer direction of the tire and locating the point Δ toward the belt 6 with respect to the straight line CL as a standard is represented by $r_i^U$ (i=1, ... $m^U$), and a radius of an arc having a center in the outer direction of the tire and locating the point Δ toward the normal rim 7 with respect to the straight line CL as a standard is represented by $r_i^L$ (i=1, ... $m^L$).

According to the invention, the above radii are preferable to be within ranges of the following equations (1)-(4) in relation with the radii RA and RB, respectively:

$$0.1 \leq \frac{R_i^U}{RA} \leq 0.7 \ (i = 1, \ldots n^U) \quad (1)$$

$$0.1 \leq \frac{R_i^L}{RB} \leq 0.7 \ (i = 1, \ldots n^L) \quad (2)$$

$$0.3 \leq \frac{r_i^U}{RA} \leq 1.0 \ (i = 1, \ldots m^U) \quad (3)$$

$$0.3 \leq \frac{r_i^L}{RB} \leq 1.0 \ (i = 1, \ldots m^L) \quad (4)$$

As mentioned above, the carcass line is adopted to have at least two inflection points each of between the positions A and C and between the positions B and C, whereby the running performances of the tire can be improved while using only the conventionally used members without requiring new addition or change to the structure of the tire as well as the reinforcing member for the tread and bead portions, so that the invention has great merits in the quality and productivity of the tire.

The aforementioned peculiar profile of the carcass line is obtained by controlling a distribution of rubber gauge ranging from an inner wall of a mold to the carcass ply in a rotational axis direction of the tire in the building-up and vulcanization of the tire.

Moreover, if it is intended to strictly control the change or scattering of the carcass line due to a so-called "rubber flow" in the vulcanization, the following method is particularly effective.

Figure 2:
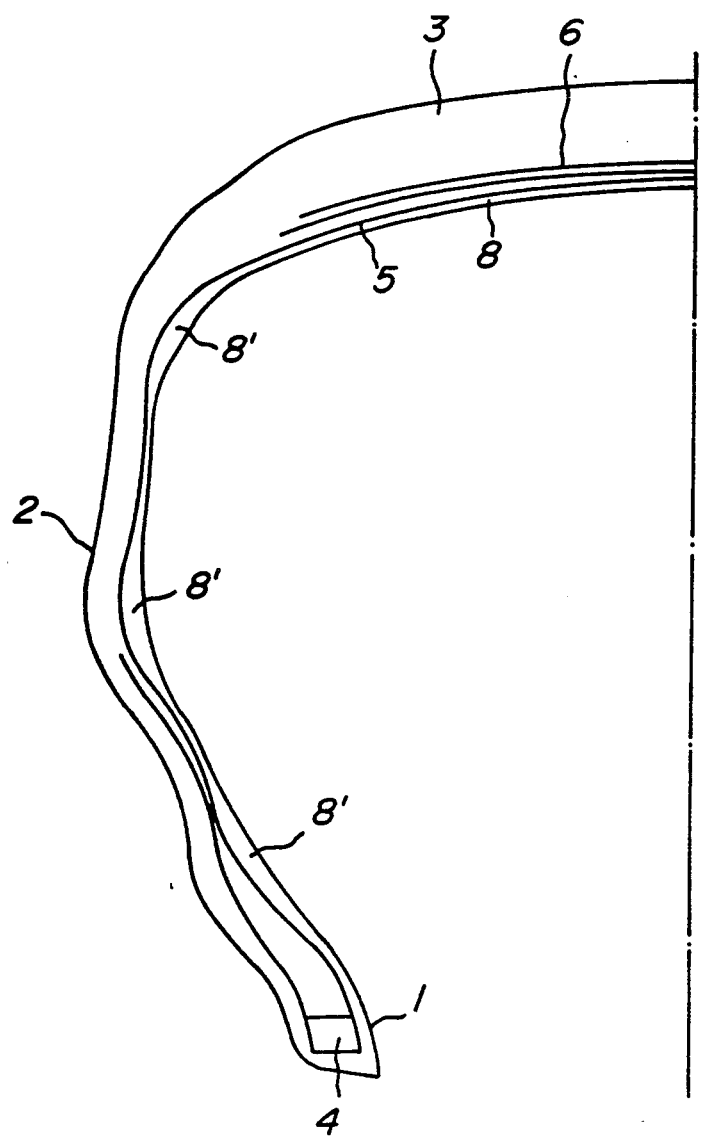
FIG. 2 is a diagrammatically sectional view of the radial tire according to the invention.

That is, the cord ply of the carcass 5 extending between the bead cores 4 is merely arranged along the inner shape of the tire according to the conventional building-up and vulcanization method. On the other hand, according to the invention, an inner liner 8 having locally different thickness portions 8' may be used as shown in FIG. 2.

In addition, the change in the curvature of the carcass line may properly be controlled by forming continuous protrusions on a periphery of a bladder for vulcanization at positions corresponding to curvature changed portions of the carcass line.

By considering such a laborless means, the carcass line according to the invention can properly be controlled without causing the variation or scattering in the productivity as previously explained.

According to the invention, the carcass line of the pneumatic radial tire in the radial section at the self-posture under an internal pressure corresponding to 5% of a normal internal pressure has at least two inflection points between the positions A and C and/or between the positions B and C.

Figure 3:
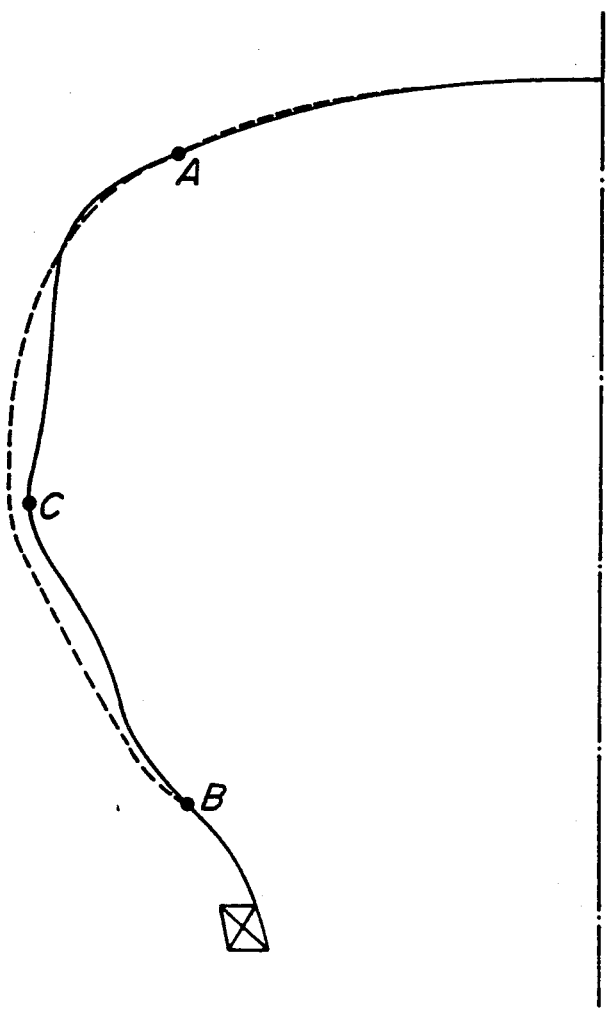
FIG. 3 is a schematic view showing deformation behavior in the inflation under a normal internal pressure.

In FIG. 3 is shown carcass profiles having two inflection points each of between the positions A and C and between the positions B and C before and after the inflation under a normal internal pressure, in which a solid line is a carcass profile before the inflation and dotted lines are a carcass profile after the inflation. As to the deformation between the positions A and C, a portion of the carcass line having a center of curvature in an inside direction of the tire in adjacent to the position A deforms inward the tire without changing the curvature center, while a portion of the carcass line having a center of curvature in an outside direction of the tire deforms outward the tire with changing the curvature center into the inside of the tire.

As to the deformation between the positions B and C, a portion of the carcass line having a center of curvature in an outside direction of the tire beneath the position C deforms outward the tire with changing the curvature center into the inside of the tire, while a portion of the carcass line having a center of curvature in an inside direction of the tire in adjacent to the position A deforms inward the tire without changing the curvature center.

The strain produced along the carcass line due to the deformation of the tire is considered as follows.

In the portion wherein the curvature center changes from the outside of the tire toward the inside thereof, the carcass line has room against the deformation of the tire before the inflation under normal internal pressure, so that the strain produced along the carcass line after the inflation under normal internal pressure becomes small, and consequently the tension is small. Similarly, when the curvature center of the carcass line is held inside the tire before and after the inflation, if the carcass line is deformed inward during the inflation under normal internal pressure, the tension is small due to the presence of room against the deformation, while if the carcass line is deformed outward during inflation under normal internal pressure, the tension becomes large to a certain extent.

In the tension distribution between the positions A and C, the carcass line adjoining to the position A deforms inward with holding the curvature center at the inside of the tire through the inflation under normal internal pressure, so that the tension is small. Further, the position of curvature center in the carcass line located beneath the above carcass line portion changes from the outside of the tire toward the inside thereof, so that the tension is small.

That is, since the carcass tension near the widthwise end of the belt 6 is small, the belt tension increases by a quantity that the carcass tension is reduced from a balance between the internal pressure and the sum of carcass tension and belt tension.

In the tension distribution between the positions B and C, the curvature center in the carcass line located beneath the position C changes from the outside of the tire toward the inside thereof through the inflation under normal internal pressure, so that the tension is small. On the other hand, the carcass line located beneath the above carcass line portion deforms outward while holding the curvature center at the inside of the tire, so that the tension is not small. Therefore, a portion of the carcass tension reduced beneath the position C shifts to the lower portion of the carcass line from a balance between the internal pressure in the bead portion and the carcass tension to further enhance the tension near to the bead portion.

As a result, the tension is ununiformly distributed through the carcass line, whereby a large tension can be given to the tread portion requiring a large road gripping force and to the bead portion requiring a large transmission force to the rim consequently the various running performances are considerably improved.

Moreover, in order to give the most effective tension to the tread and bead portions, the adequate arrangement of radius of curvature of the carcass line and position of inflection point or radii $R_i^U$ (i=1, ... $n^U$), $R_i^L$ (i=1, ... $n^L$), $r_i^U$ (i=1, ... $m^U$), and $r_i^L$ (i=1, ... $m^L$), per RA and RB as shown in FIG. 1 are favorable to be within the following ranges, respectively:

$$0.1 \leq \frac{R_i^U}{RA} \leq 0.7 \ (i = 1, \ldots n^U)$$

$$0.1 \leq \frac{R_i^L}{RB} \leq 0.7 \ (i = 1, \ldots n^L)$$

$$0.3 \leq \frac{r_i^U}{RA} \leq 1.0 \ (i = 1, \ldots m^U)$$

$$0.3 \leq \frac{r_i^L}{RB} \leq 1.0 \ (i = 1, \ldots m^L)$$

Further, when the thickness of the inner liner 8 is locally changed as a previously shown in FIG. 2, it is desirable that the portion 8' of FIG. 2 is 1.7 to 8 times, preferably 2 to 4 times higher than the average thickness of the inner liner in order to sufficiently suppress the change of the casing line.

The following example is given in illustration of the invention and is not intended as limitation thereof.

There was provided a passenger car tire (size: 165 SR13) comprising two steel cord belt layers and one carcass cord ply as shown in FIGS. 1 and 2 and having a carcass line satisfying $R_1^U/RA=0.3$, /RA=0.9, $R_1^L/RB=0.3$, $r_1^L/RB=0.6$, and $R_2^L/RB=0.55$. Then, an actual running test was made with respect to this tire together with the conventional tire having a carcass profile of natural equilibrium state. As a result, when the running stability was evaluated by the 10 point method, it was improved by 1.5 points in the tire according to the invention as compared with the conventional tire.

Figure 4:
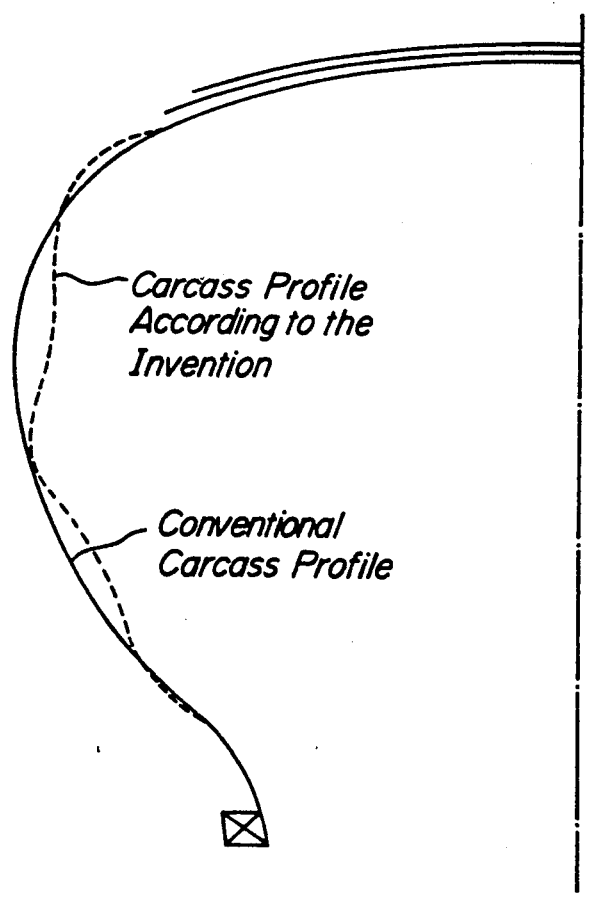
FIG. 4 is a schematic view showing a comparison of carcass profile used in the comparisons of FIGS. 5 and 6.
Figure 5:
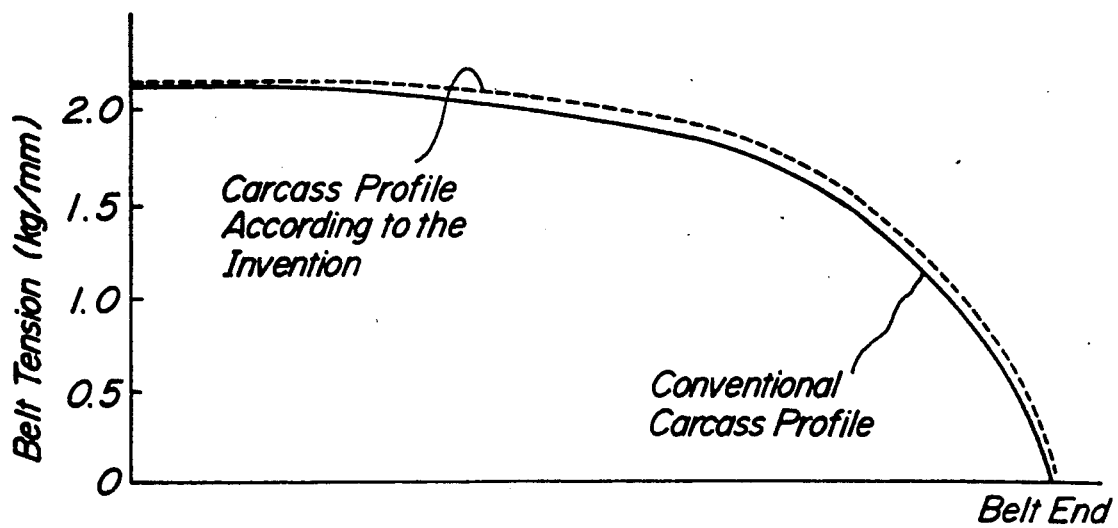
FIG. 5 is a graph showing a comparison of tension distribution in the belt between the tire according to the invention and the conventional tire.
Figure 6:
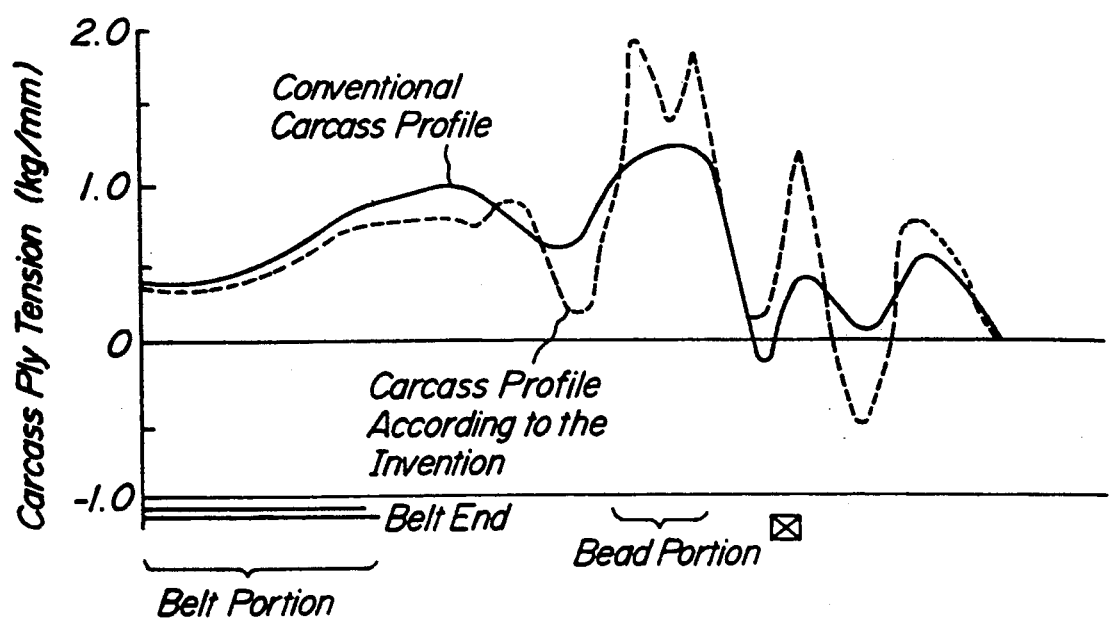
FIG. 6 is a graph showing a comparison of tension distribution in the carcass ply between the tire according to the invention and the conventional tire.

The profile of the carcass line in the tire according to the invention and the conventional tire is shown in FIG. 4, in which a solid line is a natural equilibrium profile of the conventional tire before the inflation under normal internal pressure and dotted lines are the carcass profile of the invention before the inflation under normal internal pressure. Furthermore, the distribution of belt tension after the inflation under normal internal pressure in the tire according to the invention and the conventional tire is shown in FIG. 5, while the distribution of carcass ply tension after the inflation under normal internal pressure in the tire according to the invention and the conventional tire is shown in FIG. 6.

As mentioned above, according to the invention, the belt rigidity and the bead rigidity of the tire can advantageously be increased without enhancing the belt and bead reinforcements or increasing the internal pressure, which contributes to the improvement of the running performances in the tire.

What is claimed is:

1. A pneumatic radial tire having improved running performance comprising; a carcass composed of at least one radial cord ply toroidally extending between a pair of bead portions as a casing reinforcement for sidewall portions and tread portion connecting to the bead portions, at least one cord ply of said carcass being wound around a bead core of the bead portion from inside of the tire toward outside thereof to form a turnup structure, and a belt composed of plural cord layers arranged along a crown portion of the carcass as a tread reinforcement, wherein, when the tire is mounted onto a normal rim and inflated under an internal pressure corresponding to 5% of a normal internal pressure, a carcass line of the carcass in radial section of the tire at a self-posture under no load has at least two inflection points in a first zone on a side of carcass with respect to an equatorial line between positions A and C and/or two inflection points in a second zone on said side of said carcass between positions C and B, in which position A is a point on said carcass line corresponding to each end of the belt at its maximum width defined by a line extending from a widthwise end of said belt perpendicular to a rim base line to said carcass line, B is a point on said carcass line corresponding to a width of the normal rim defined by a line extending from an end of said rim perpendicular to said rim base line to said carcass line and C is a point on said carcass line corresponding to a maximum width of the carcass; wherein the tire further comprises an inner liner having portions of different thickness to change the curvature of said carcass line.

2. The pneumatic radial tire according to claim 1, wherein heights $H_1$, $H_2$ and M of the positions A, B and C measured from said rim base line of the normal rim are respectively within ranges of 0.80–1.0, 0.10–0.25 and 0.35–0.70 of a carcass maximum height H measured from said same rim base line.

3. A pneumatic radial tire having improved running performance comprising; a carcass composed of at least one radial cord ply toroidally extending between a pair of bead portions as a casing reinforcement for sidewall portions and tread portion connecting to the bead portions, at least one cord ply of said carcass being wound around a bead core of the bead portion from inside of the tire toward outside thereof to form a turnup structure, and a belt composed of plural cord layers arranged along a crown portion of the carcass as a tread reinforcement, wherein, when the tire is mounted onto a normal rim and inflated under an internal pressure corresponding to 5% of a normal internal pressure, a carcass line of the carcass in radial section of the tire at a self-posture under no load has at least two inflection points in a first zone on a side of carcass with respect to an equatorial line between positions A and C and/or two inflection points in a second zone on said side of said carcass between positions C and B, in which position A is a point on said carcass line corresponding to each end of the belt at its maximum width defined by a line extending from a widthwise end of said belt perpendicular to a rim base line to said carcass line, B is a point on said carcass line corresponding to a width of the normal rim defined by a line extending from an end of said rim perpendicular to said rim base line to said carcass line and C is a point on said carcass line corresponding to a maximum width of the carcass, wherein said carcass line and position of said inflection points are defined by radii $R_i$ ($i=1, \ldots n^U$), $R_i$ ($i=1, \ldots n^L$), $r_i$ ($i=1, \ldots m^U$), and $r_i$ ($i=1, \ldots m^L$), taken from a centerline extending from position C parallel to said rim base line and are within:

$$0.1 \leq \frac{R_i^U}{RA} \leq 0.7 \ (i = 1, \ldots n^U)$$

$$0.1 \leq \frac{R_i^L}{RB} \leq 0.7 \ (i = 1, \ldots n^L)$$

$$0.3 \leq \frac{r_i^U}{RA} \leq 1.0 \ (i = 1, \ldots m^U)$$

$$0.3 \leq \frac{r_i^L}{RB} \leq 1.0 \ (i = 1, \ldots m^L)$$

where; RA is a radius of an arc passing through positions A and C and RB is a radius of an arc passing through positions B and C, RA and RB centered on said centerline, R is a center of curvature measured from inside said tire, r is a center of curvature as measured from outside said tire, the superscript U indicates an arc of a given curvature located outward in a radial direction from a line CL passing through position C and parallel to said rim base line and a superscript L indicates an arc of a given curvature inward in a radial direction from said line CL and m and n represent different radii of curvature when plural inflection points are present.

4. The pneumatic radial tire according to claim 3, wherein heights $H_1$, $H_2$ and M of the positions A, B and C measured from said rim base line of the normal rim are respectively within ranges of 0.80–1.0, 0.10–0.25 and 0.35–0.70 of a carcass maximum height H measured from said same rim base line.

* * * * *